United States Patent
Chang et al.

(10) Patent No.: US 7,908,272 B2
(45) Date of Patent: Mar. 15, 2011

(54) UNIVERSAL INFORMATION CODE FORMAT FOR TWO DIMENSIONAL BAR CODE AND INTERACTIVE INFORMATION EXCHANGE SYSTEM USING THE SAME

(75) Inventors: Yi-Chieh Chang, Taichung (TW); Yarn-Chen Chen, Hsin-Chu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 376 days.

(21) Appl. No.: 11/643,863

(22) Filed: Dec. 22, 2006

(65) Prior Publication Data

US 2007/0214155 A1 Sep. 13, 2007

(30) Foreign Application Priority Data

Mar. 8, 2006 (TW) ................................ 95107780 A

(51) Int. Cl.
*G06F 7/00* (2006.01)
*G06F 17/30* (2006.01)
(52) U.S. Cl. ........................................................ 707/736
(58) Field of Classification Search ............... 707/1, 711, 707/747, 736; 235/462.25, 462.46
See application file for complete search history.

(56) References Cited

U.S. PATENT DOCUMENTS

| | | | | |
|---|---|---|---|---|
| 5,378,881 A * | 1/1995 | Adachi | ..................... | 235/462.09 |
| 5,945,660 A * | 8/1999 | Nakasuji et al. | ......... | 235/462.46 |
| 5,959,285 A * | 9/1999 | Schuessler | ............... | 235/462.04 |
| 5,979,762 A * | 11/1999 | Bianco | ..................... | 235/462.01 |
| 6,149,063 A | 11/2000 | Reynolds et al. | ......... | 235/472.02 |
| 6,176,429 B1 * | 1/2001 | Reddersen et al. | ...... | 235/462.25 |
| 6,199,048 B1 * | 3/2001 | Hudetz et al. | .................... | 705/23 |
| 6,546,385 B1 | 4/2003 | Mao et al. | ......................... | 707/3 |
| 6,577,861 B2 | 6/2003 | Ogasawara | ................... | 455/419 |
| 6,629,642 B1 | 10/2003 | Swartz et al. | ............. | 235/462.46 |
| 6,679,421 B2 * | 1/2004 | Shin et al. | ....................... | 235/375 |
| 6,726,094 B1 | 4/2004 | Rantze et al. | .................. | 235/379 |
| 6,736,322 B2 | 5/2004 | Gobburu et al. | .......... | 235/462.46 |
| 6,910,624 B1 | 6/2005 | Natsuno | ......................... | 235/379 |
| 7,058,639 B1 * | 6/2006 | Chatterjee et al. | ..................... | 1/1 |
| 2005/0252974 A1 | 11/2005 | Mizukoshi | ............... | 235/462.15 |

* cited by examiner

*Primary Examiner* — Greta L Robinson
*Assistant Examiner* — Jeffrey Chang
(74) *Attorney, Agent, or Firm* — Bacon & Thomas, PLLC

(57) ABSTRACT

A Universal Information Code (UIC) resolves the encoding limitation associated with the known 2D bar code format. The UIC includes at least a type field and an index field. The type field indicates application type and format of other fields. The index field provides an index to access a website, categories of information, keyword of information, index or link to associated information and expansion information. The UIC further includes optionally a text description field and an authorization field. The text description field can be used to include a textual description of the website. The authorization field can be used to store password or public key. A mobile terminal device equipped with camera can fetch an image of the 2D bar code in UIC format and then extract related fields for interactive information exchange with a database.

23 Claims, 12 Drawing Sheets

| Field | | | |
|---|---|---|---|
| 1 | Type 52 | | Types of UIC application and format |
| 2 | Index 54 | IP address or URL 54A | www.media.mit.edu |
| | | Information category 54B | Pointer to database |
| | | Information content 54C | Pointer to database |
| | | Associated information 54D | Pointer to database |
| | | Expansion information 54E | Pointer to database |
| 3 | Description 56 | | Text description |
| 4 | Authorization 58 | | Password/public key |

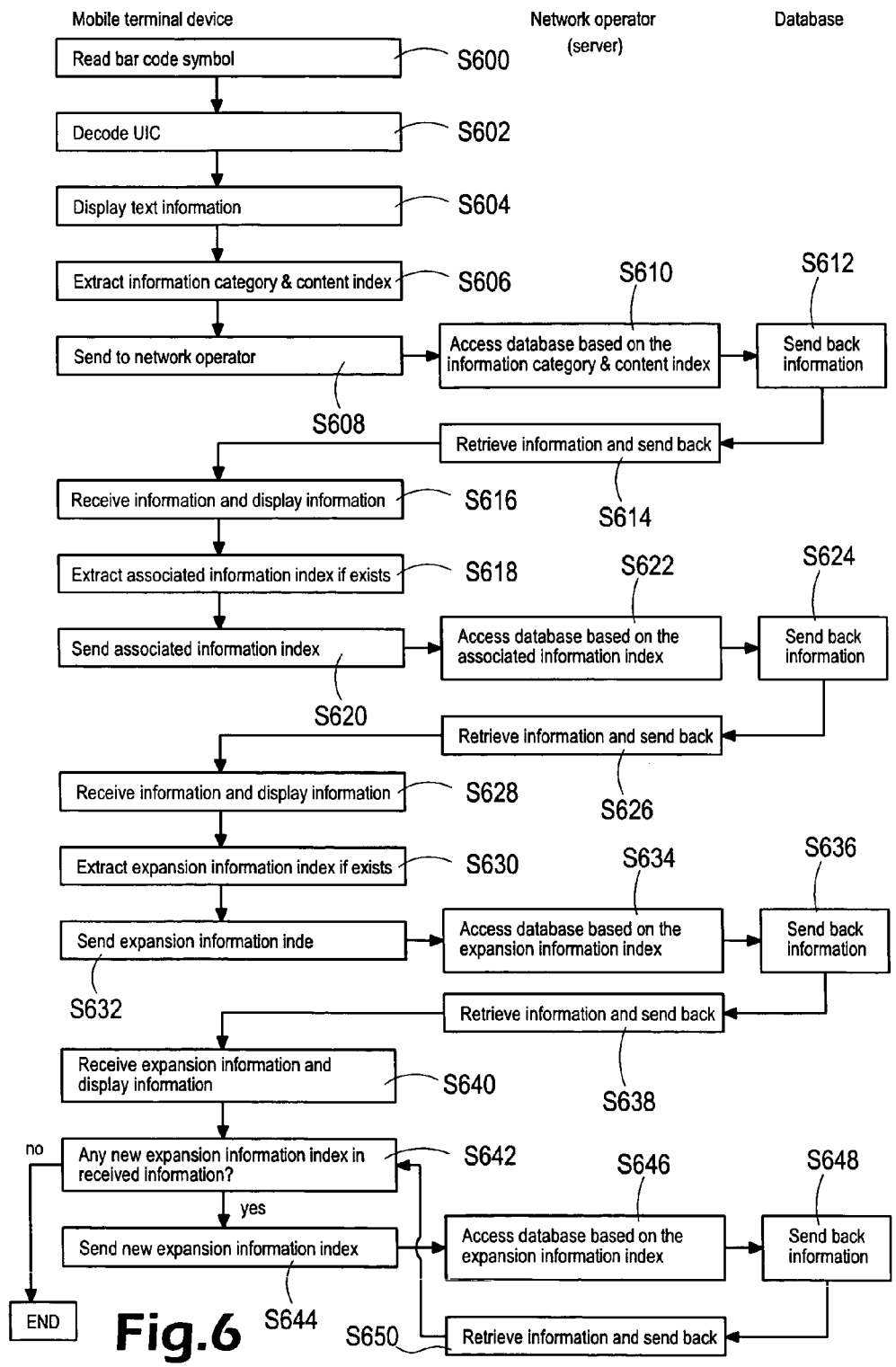

| | |
|---|---|
| URL<br>IP address | www.sunplus.com<br>192.105.25.1 |
| Types of applications | 1. Advertisement  4. Shopping and transaction<br>2. Data search    5. Secured data<br>3. Publication |
| Information category | Car, Book, Electronics, CD, Music, Menu |
| Keyword of information content | High performance, Low cost<br>Power control, Stereo |
| Information content | **** |
| Information abstract or a brief description | (Up to 1024 characters) |
| Authorization password/public key | ***** |

Fig.8

UNIVERSAL INFORMATION CODE FORMAT FOR TWO DIMENSIONAL BAR CODE AND INTERACTIVE INFORMATION EXCHANGE SYSTEM USING THE SAME

BACKGROUND

1, Field of the Invention

The present invention relates generally to an information code format and, more particularly, to a universal information code format for two dimensional (2D) bar code and an interactive information exchange system using the 2D bar code.

2. Background of the Invention

The 2D bar code symbol has been used in many applications associated with a mobile communication device. Users can use their mobile devices shop in a department store, purchase online, exchange data or information, and conduct other electronic transactions.

In most of the existing applications or patented technologies, the product information or data is directly encoded on the 2D bar code symbol. The mobile communication device scans the 2D bar code symbol and processes the symbol to obtain the needed information to conduct the electronic transactions or data exchange with a network operator.

Most of the existing applications encode thousands of characters in the 2D bar code format. However, this is still far below most of the information that is available or of interest to the user. Moreover due to form factor and user interface constraints, most of the mobile communication devices also lack a keyboard input interface. Thus, it is inconvenient or very slow to input alphabets or characters in these mobile communication devices. As a result, it has been proposed to record web address of database server in 2D bar code format. For example, U.S. Pat. No. 6,629,642 discloses a data system and method for accessing computer networks using a collection of bar code symbols. Each of the bar code symbols of the collection includes encoded data that is associated with a particular computer network address. A portable terminal scans or images a bar code symbol from the collection and establishes a connection with the computer network to access information stored on the computer network.

U.S. publication No. 20050252974 discloses an information delivery system that transmits information corresponding to an identifier, which is acquired by analyzing data image of a bar code. An information delivery system includes a communication terminal and a server. The communication terminal includes a camera, an analyzer and a transmitter. The camera takes an image of a bar code that stores an identifier. The analyzer analyzes image data of the bar code to acquire the identifier. The transmitter transmits the identifier to the server. The server includes a storage, a receiver and a transmitter. The storage stores information in association with the identifiers. The receiver receives the identifier transmitted from the communication terminal. The transmitter transmits information to the communication terminal. The information is retrieved using the identifier from the storage.

As mobile communication devices with built-in video cameras are becoming popular, there is a stronger for a better encoding technology that utilizes 2D bar code format for data or information exchange, especially for electronic transactions or secured data accessing.

SUMMARY OF THE INVENTION

The present invention provides a Universal Information Code (UIC) to resolve the encoding limitation associated with the known 2D bar code format. A preferred embodiment of the invention is an information code format used for a bar code and indicating a database of information. The information code format includes a type field to indicate the information type, and an index field to indicate a unique information for the database.

Another embodiment of the invention provides a device for accessing an information database. The device includes an imaging fetching unit, a processor and a wireless transceiver. The imaging fetching unit fetches an image of a bar code symbol encoded in a universal information code format having a type field to indicate the information type and an index field to indicate a unique information for the database. The processor is connected to the imaging fetching unit and configured to extract the type field and the index field in the bar code symbol. The wireless transceiver is connected to the processor and communicating with the information database.

Another embodiment of the invention provides a method for facilitating a mobile terminal device to access a database wirelessly through a bar code symbol. The a bar code symbol is encoded in a universal information code format, which has a type field to indicate the information type and an index field to indicate a unique information for the database. The mobile terminal device first reads the bar code symbol and then the universal information code is decoded from the bar code symbol. Finally, the type of information in the database is identified with reference to the type field.

BRIEF DESCRIPTION OF THE DRAWINGS

FIG. 3 shows a schematic diagram of the UIC format according to a preferred embodiment of the present invention.

FIG. 6 is a sequence diagram for processing UIC according to a preferred embodiment of the present invention.

FIG. 8 shows a format of information upload table according to a preferred embodiment of the present invention.

DETAILED DESCRIPTION OF THE INVENTION

Figure 1:
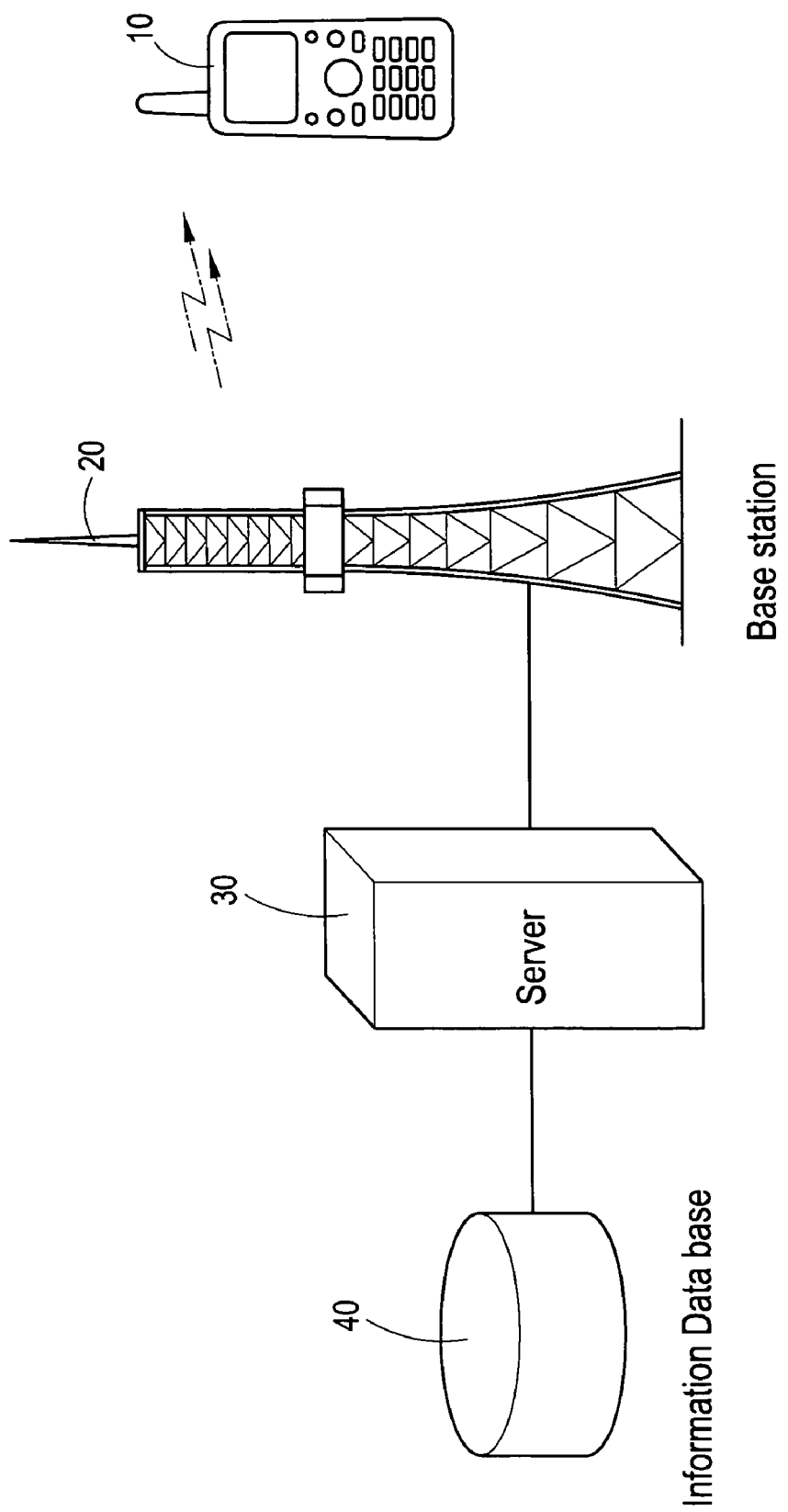
FIG. 1 shows a schematic diagram of an interactive information exchange system according to a preferred embodiment of the present invention.

FIG. 1 shows a schematic diagram of an interactive information exchange system according to a preferred embodiment of the present invention. The interactive information exchange system includes a mobile terminal device 10, a base station 20, a server 30, and an information database 40. The mobile terminal device 10 fetches an image of a universal information code (UIC) of the present invention. The mobile terminal device 10 then analyzes the image of UIC. The mobile terminal device 10 decodes the image of UIC to obtain an index of a website. The website can be associated with the information database 40. The mobile terminal device 10 then sends the index to the server 30 through the base station 20. The server 30 accesses the website of the information database 40 according to the index. Then the information database 40 sends the desired content back to the mobile terminal device 10 through the base station 20. In this manner, a user of the mobile terminal device 10 can browse the content of the information database 40. The UIC according to the present invention has a specific bar code format for versatile and interactive information acquisition. The mobile terminal device 10 can be a GPRS phone, a WCDMA phone or a CDMA 2000 phone. The base station 20 correspondingly can support GPRS, WCDMA and CDMA 2000 service. Moreover, the mobile terminal device 10 can also be WiMAX-based mobile terminal device and in this case the base station 20 is a WiMAX access point.

Figure 2:
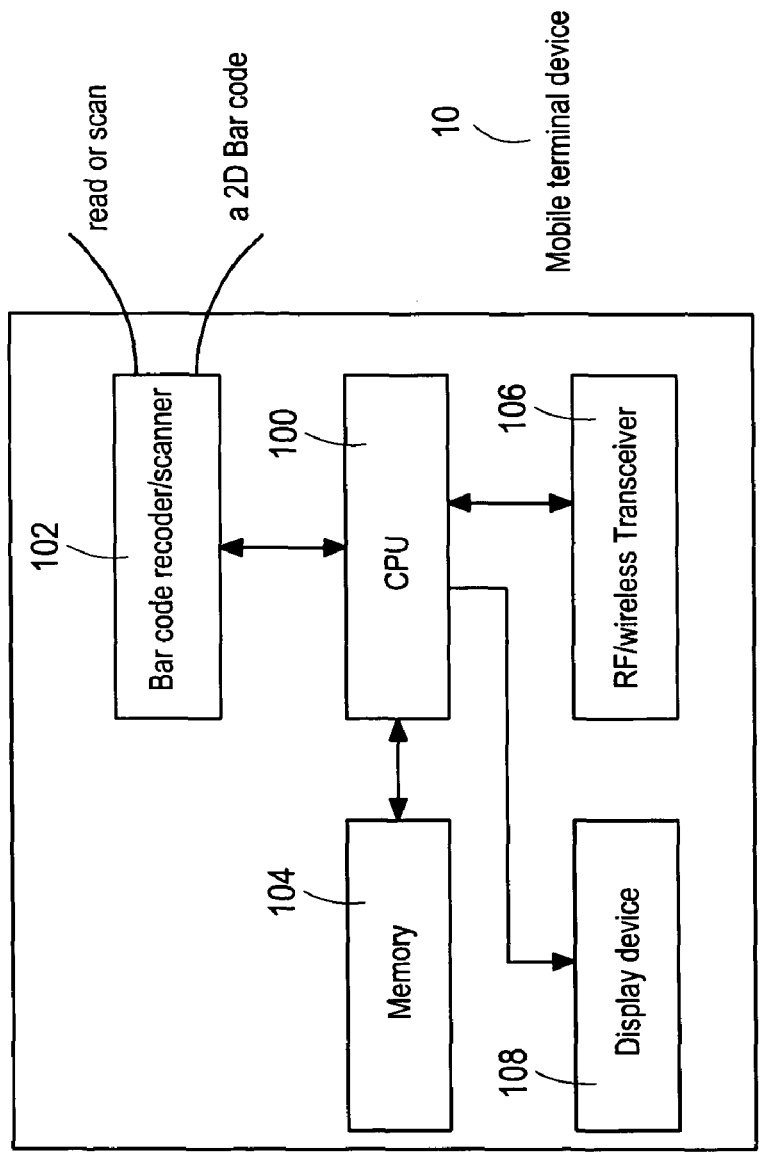
FIG. 2 shows a schematic diagram of a mobile terminal device according to a preferred embodiment of the present invention.

FIG. 2 shows a schematic diagram of a mobile terminal device 10 according to a preferred embodiment of the present invention. The mobile terminal device 10 includes a central processing unit (CPU) 100, a bar code recorder/scanner 102, a memory unit 104, a wireless transceiver 106 and a display device 108. In the present invention, the bar code recorder/scanner 102 can be a CCD camera or a CMOS camera to fetch an image of a 2D bar code.

FIG. 3 shows a schematic diagram of the UIC format according to a preferred embodiment of the present invention. Each UIC 50 includes a number of fields. In the exemplary implementation shown in FIG. 3, the UIC 50 has four fields, namely, type field 52, index field 54, text description field 56, and authorization field 58. The index field 54 further includes several sub-field indexes, which includes web address and IP address index 54A, information category index 54B, information content index 54C, associated information index 54D, and expansion information index 54E.

The type field 52 in the UIC 50 specifies the types of UIC application and formats. For example, the types of application defined in this field can include web address translation, phone number or personal data, advertisement information, purchase transaction, document or article search, etc.

The index field 54 provides an index to access a website, categories of information, keyword of information, index or link to associated information and expansion information. More particularly, the web address and IP address sub-field index 54A in the index field 54 indicates an IP address or a web address of a website, for example "www.media.mit.edu" shown in FIG. 3. The information category index 54B lists categories of information such as car, book, electronics, CD, music, menu etc. The information content index 54C provides attribution for the information in the linked website, such as High performance, Low cost, Power control, Stereo, etc. The associated information index 54D allows user to access associated information if the associated information is present or uploaded to the website by service provider. The expansion information index 54E allows user to access expansion information if the expansion information is present or uploaded by service provider.

The description field 56 is an optional field to display legendary text description for the UIC 50.

The last field is the authorization field 58. A public key is encoded in this field and is used to match a private key for an authorized user to retrieve encrypted or secured data information from the information database 40.

Figure 4:
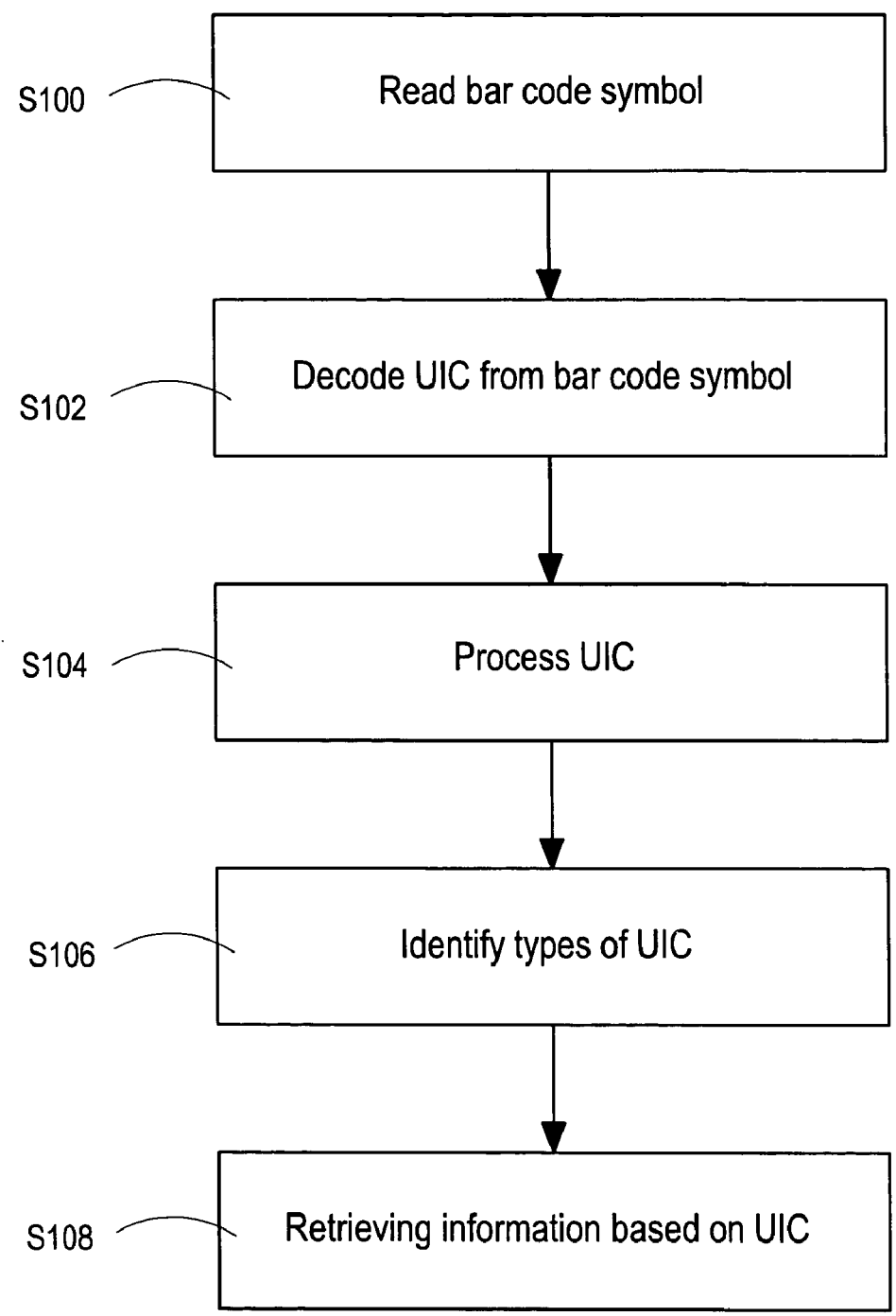
FIG. 4 shows a flowchart for bar code reading and UIC extraction process.

FIG. 4 shows a flowchart for bar code reading and UIC extraction process. In step S100, the mobile terminal device 10 reads 2D bar code symbol contactlessly. The 2D bar code symbol can be printed on, for example, newspaper, magazine or advertisement.

In step S102, a UIC 50 is decoded from the read 2D bar code symbol and the UIC 50 is processed in step S1104 to identify a type field 52 in the UIC 50. In step S106, corresponding processes is performed according to the identified type field 52. For example, the types of application defined in this field include web address translation, phone number or personal data, advertisement information, purchase transaction, document or article search, etc. In step S108, the mobile terminal device 10 retrieves information based on the UIC 50. The information can be at least one of text information, graphic information and multimedia streaming information.

Figure 5A:
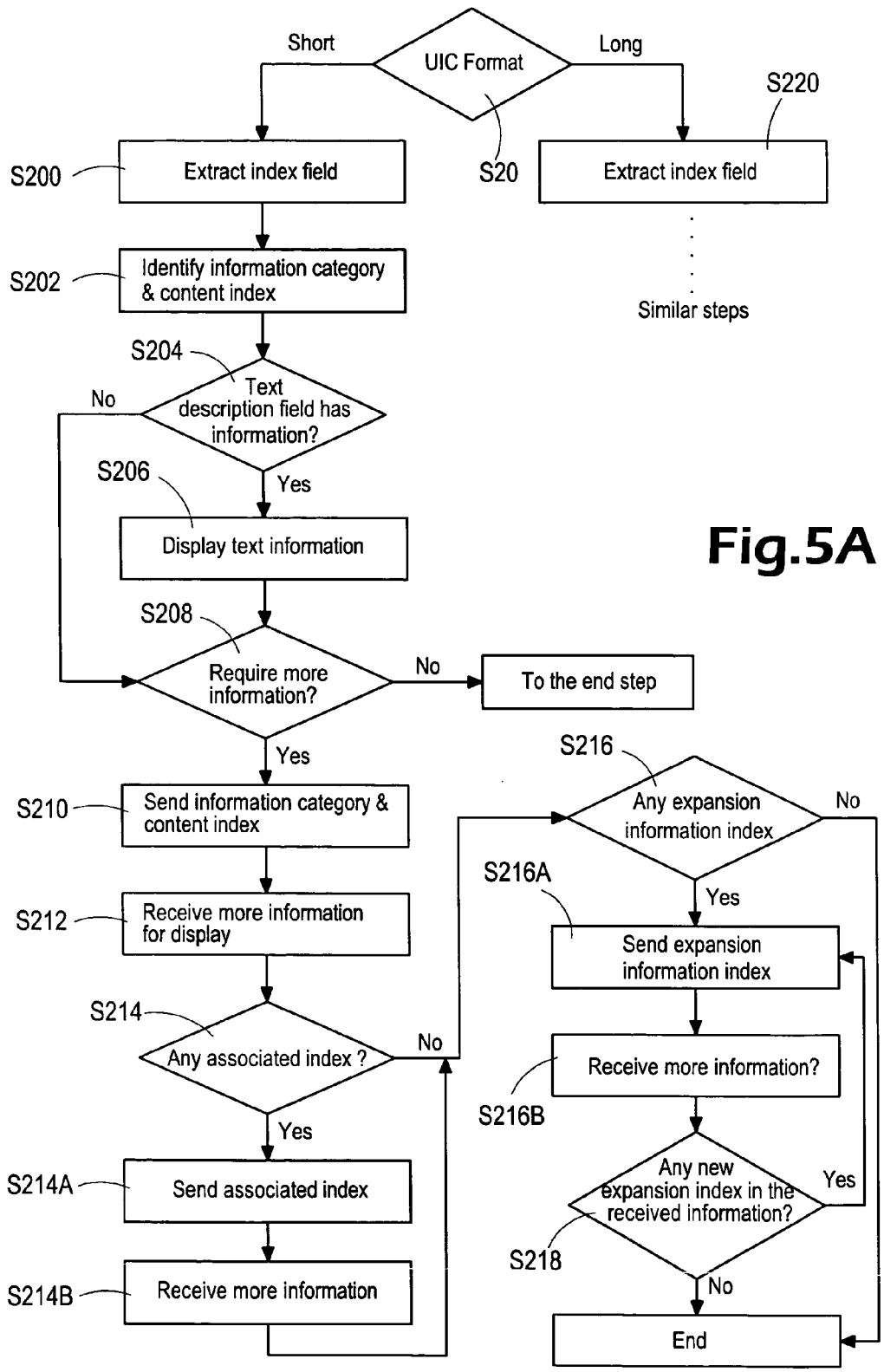
FIG. 5A shows a flowchart for processing UIC when the type of application is advertisement.

FIG. 5A shows the flowchart for processing UIC 50 when the type of application is advertisement. In step S20, the UIC format is determined according to the type field 52. When the UIC format is in short format (ipv4+32 bit CPU), the procedure beginning from step S200 is executed. When the UIC format is in long format (ipv6+64 bit CPU), the procedure beginning from step S220 is executed. In step S200, the index field 54 in UIC 50 is extracted. In step S202, the information category index 54B and the information content index 54C in the index field 54 are identified. Step S204 checks whether the text description field 56 contains any information. If the text description field 56 contains any information, the information contained in the text description field 56 is displayed in step S206. Step S208 checks whether the user wants additional information associated with the information category index 54B and the information content index 54C. If true, the information category index 54B and the information content index 54C are sent to the server 30 in step S210 and more information associated with the information category index 54B and the information content index 54C is sent to the mobile terminal device 10 in step S212. For example, in the exemplary embodiment of advertisement application, if the user wants to know more information about "Car" in information category index 54B and about "High performance" in information content index 54C, he can send the information category index 54B and the information content index 54C to the server 30 in order to acquire more refined information.

Step S214 checks whether associated information index 54D is present in the UIC 50. If true, the associated information index 54D is sent to the server 30 in step S214A and more information relevant to the associated information index 54D is received by the mobile terminal device 10 in step S214B. Afterward, the procedure proceeds to step S216.

Step S216 checks whether expansion information index 54E is present in UIC 50. If true, the expansion information index 54E is sent to the server 30 in step S216A and new information relevant to the expansion information index 54E is received by the mobile terminal device 10 in step S216B. Step S218 checks whether the new information contains another expansion information index 54E'. If true, the procedure is back to step S216A to retrieve more information by sending the expansion information index 54E'.

When the UIC format is in long format (ipv6+64 bit CPU), the procedure beginning from step S220 is executed. These steps are similar to those shown in left half portion of FIG. 3 and the description thereof is omitted here for clarity.

Figure 5B:
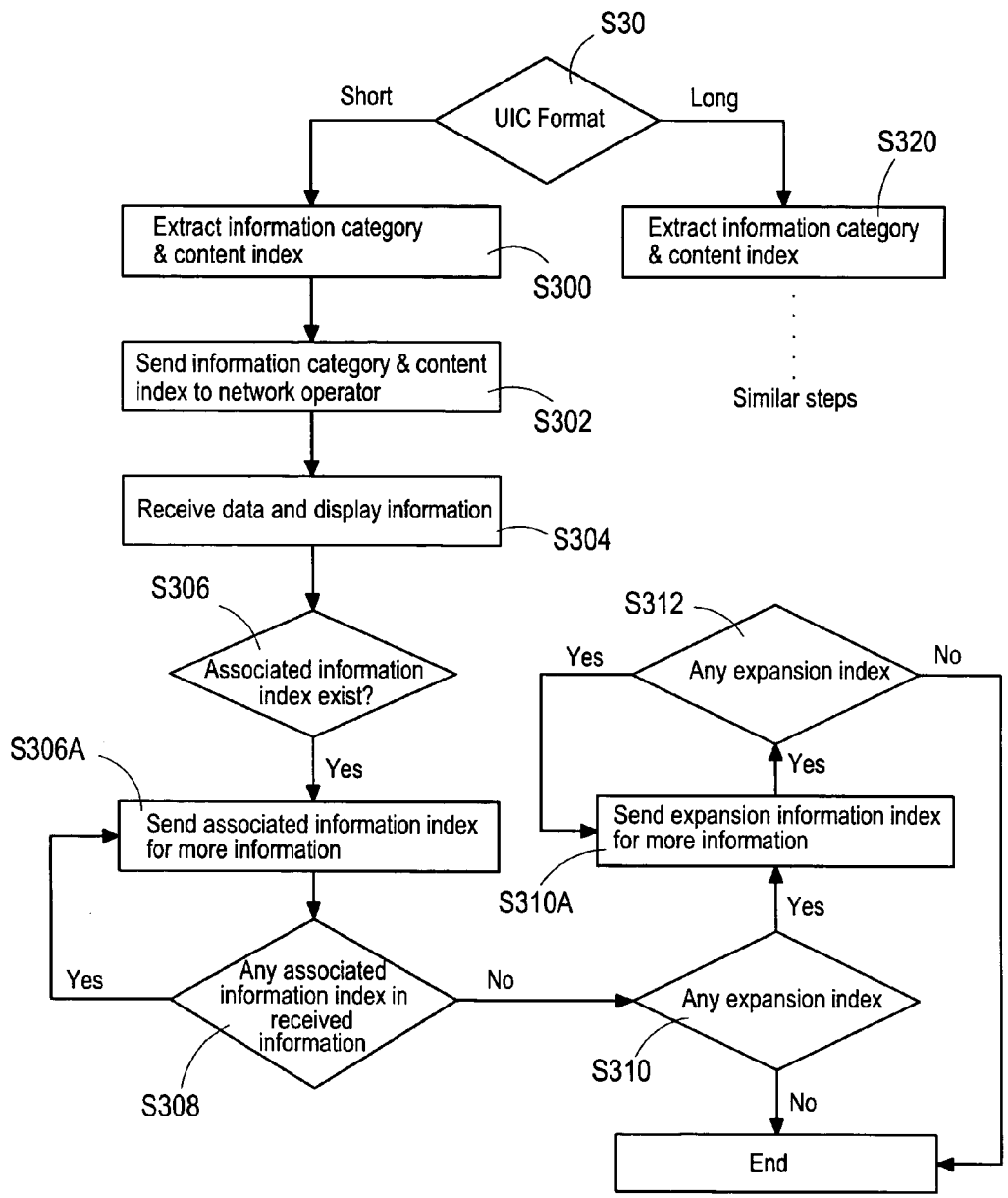
FIG. 5B shows flowchart for processing UIC when the type of application is for searching information.

FIG. 5B shows a flowchart for processing UIC when the type of application is for searching information. In step S30, the UIC format is determined according to the type field 52. When the UIC format is in short format (ipv4+32 bit), the procedure beginning from step S300 is executed. When the UIC format is in long format (ipv6+64 bit CPU), the procedure beginning from step S320 is executed. In step S300, information category index 54B and information content index 54C are extracted from UIC 50. In step S302, the information category index 54B and information content index 54C are sent to the server 30. In step S304, the information relevant to the information category index 54B and information content index 54C are retrieved and displayed on the mobile terminal device 10. Step 306 checks whether associated information index 54D is present in the UIC 50. If true, the associated information index 54D is sent to the server 30 in step S306A for more information relevant to the associated information index 54D. Step 308 checks whether any new associated information index 54D is present in the received information. If true, the step S306A is performed again to fetch new information. Otherwise, step S310 checks whether expansion information index 54E is present in the UIC 50. If true, the expansion information index 54E is sent to the server 30 in step S310A for new information relevant to the expansion information index 54E. Step S312 checks whether another expansion information index 54E' is present in the new information. If true, the procedure is back to step S318A to retrieve information relevant to another expansion information index 54E'.

Figure 5C:
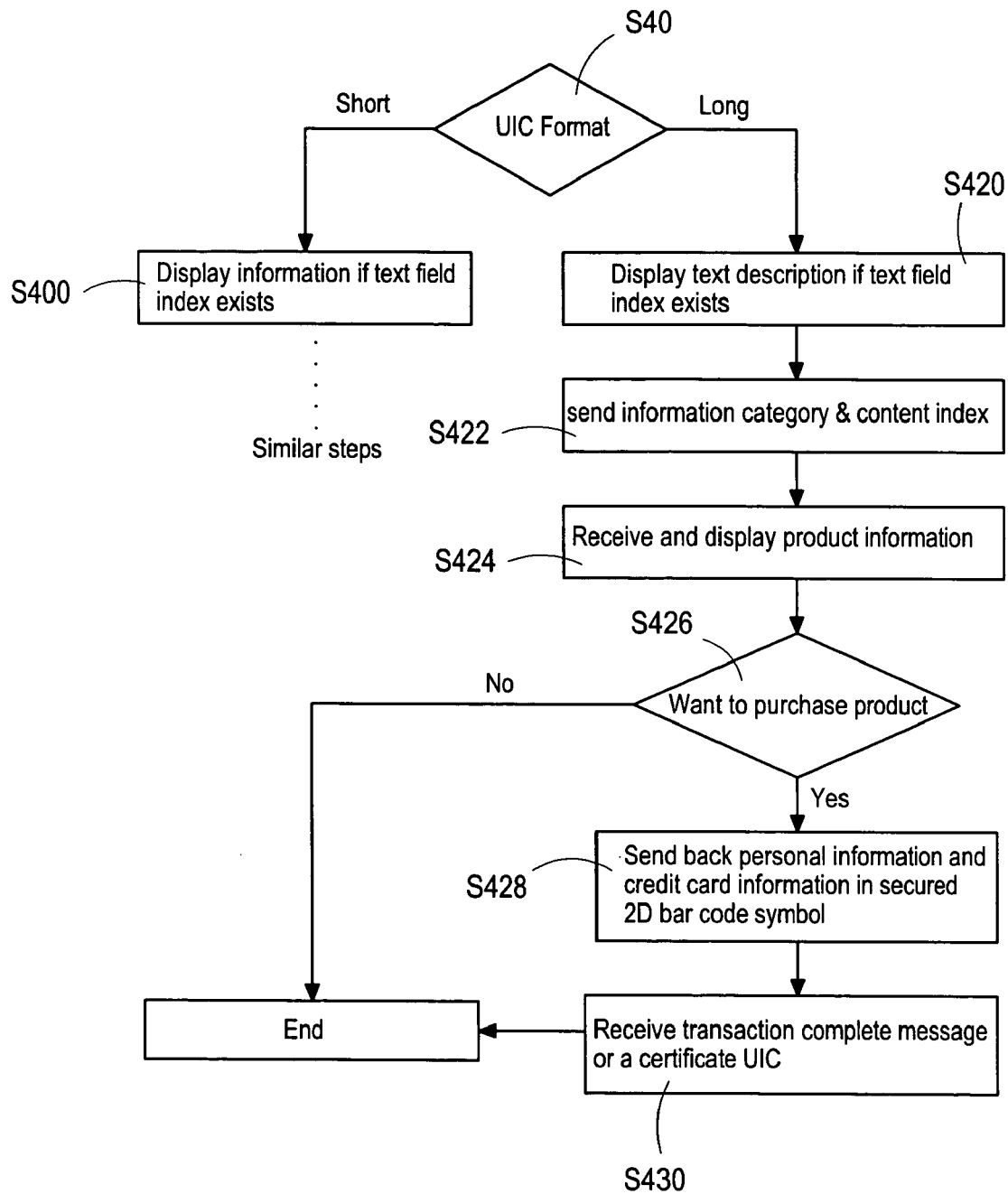
FIG. 5C shows a flowchart for processing UIC when the type of application is for purchase/transaction.

FIG. 5C shows the flowchart for processing UIC when the type of application is for purchase/transaction. In step S40, the UIC format is determined according to the type field 52. When the UIC format is in short format (ipv4+32 bit), the procedure beginning from step S400 is executed. When the UIC format is in long format (ipv6+64 bit CPU), the procedure beginning from step S420 is executed. In step S420, the text description information relevant to UIC 50 is displayed if the text description field 56 is present in the UIC 50. In step S422, information category index 54B and information content index 54C of UIC 50 are sent to the server 30. In step S424, product information relevant to information category index 54B and information content index 54C are displayed on the mobile terminal device 10. For example, if the user wants to purchase mobile phone with camera, he can select "Mobile phone" in information category index 54B and "camera function" in information content index 54C, and then sends the information category index 54B and information content index 54C to server 30 in step S426. All products relevant to his requirement will be displayed on the mobile terminal device 10 for further purchase consideration. In step S428, the user sends back personal information or credit card information in secured 2D bar code symbol if he wants to buy product shown in the mobile terminal device 10. In step S430, the server 30 sends transaction complete message or a certificate UIC to the mobile terminal device 10 if the transaction is successful.

Figure 5D:
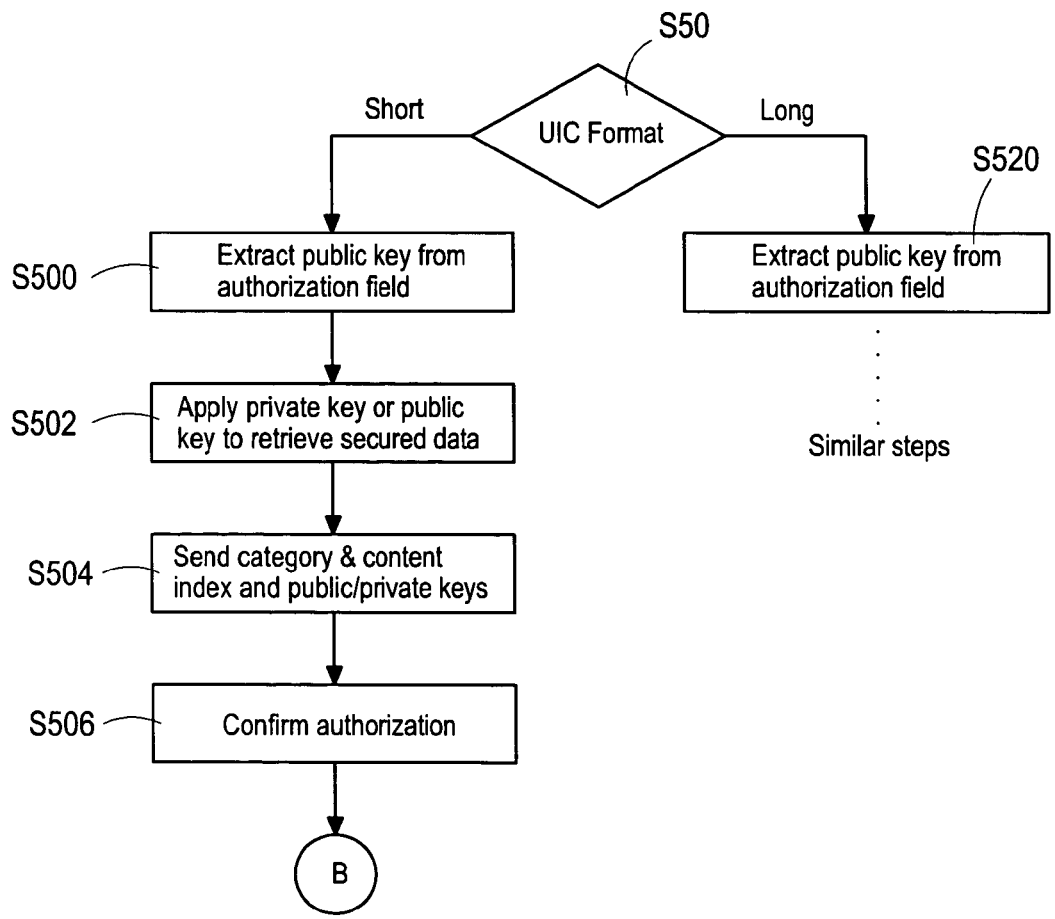
FIG. 5D shows a flowchart for processing UIC when the type of application is for secured data.

FIG. 5D shows the flowchart for processing UIC when the type of application is for secured data. In step S50, the UIC format is determined according to the type field 52. When the UIC format is in short format (ipv4+32 bit), the procedure beginning from step S500 is executed. When the UIC format is in long format (ipv6+64 bit), the procedure beginning from step S520 is executed. In step S500, a public key is extracted from authorization field 58. In step S502, a private key or a public key is obtained from an authorized website or a service provider to retrieve secured information. In step S504, information category index 54B and information content index 54C along with the public key and the private key are sent to the server 30. In step S506, the server 30 will confirm the authorization according to the public key and the private key. The rest operations (collectively represented by circle B) are similar to those steps beginning at step S306 of FIG. 5B. Therefore, the detailed descriptions for the rest operations are omitted here.

Figure 5E:
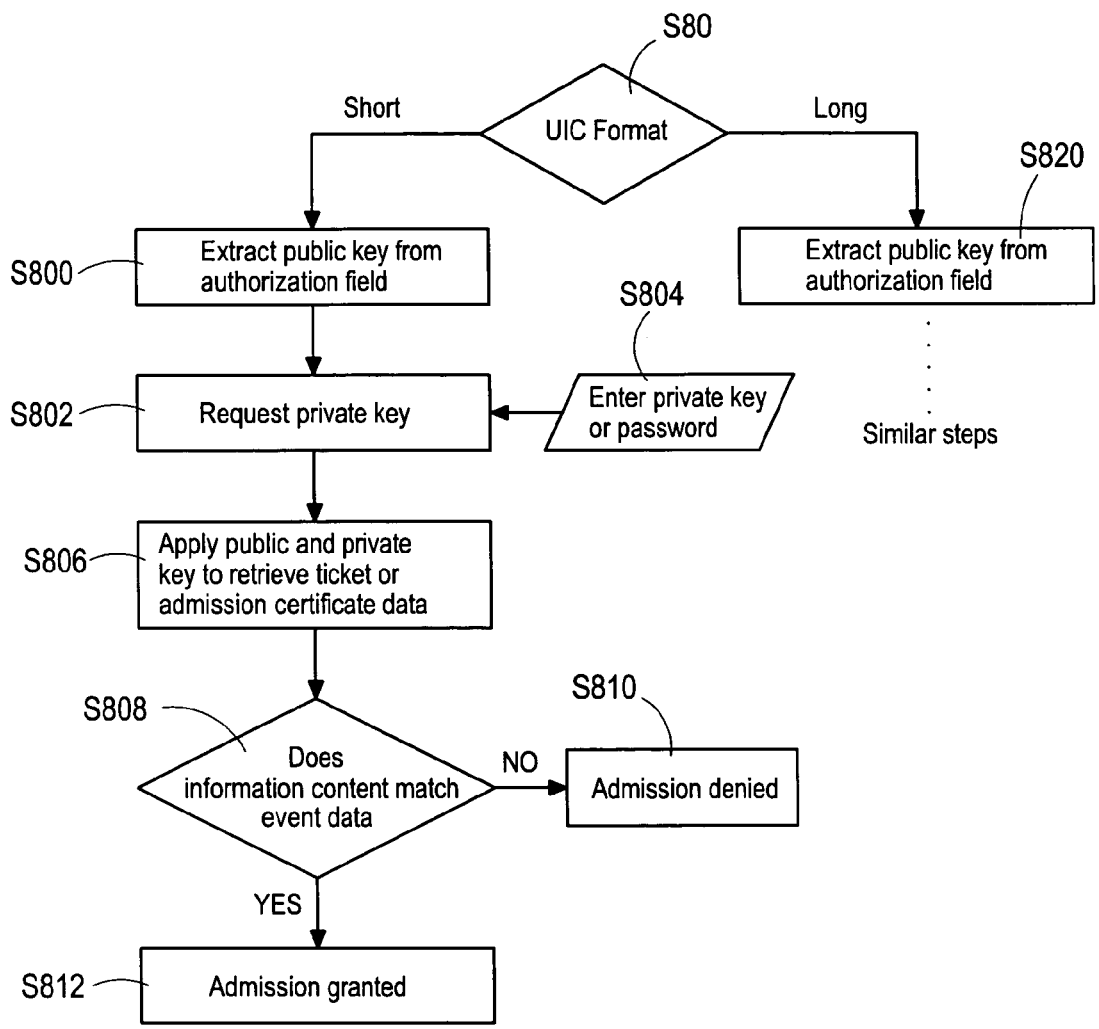
FIG. 5E shows a flowchart of processing UIC to authenticate an admission.

FIG. 5E shows the flowchart of processing UIC to authenticate an admission, such as admission to receive ticket or admission to receive certificate data. In step S80 the UIC format is determined according to the type field 52. When the UIC format is in short format ((ipv4+32 bit), the procedure beginning from step S800 is executed. When the UIC format is in long format (ipv6+64 bit), the procedure beginning from step S820 is executed. In step S800, a public key is extracted from authorization field 58. In step S802, a private key is requested and user enters the private key or password in step S804. In step S806, the public key and the private key are applied to retrieve ticket or admission certificate data. Step S808 examines whether the information content retrieved in step S806 matches an event data. When the information content matches the event data, step S812 is performed to grant the admission. When the information content does not match the event data, step S810 is performed to deny the admission.

FIG. 6 is a sequence diagram for processing the UIC 50, where command and data transmitted among mobile terminal device 10, server 30 and database 40 are demonstrated. As shown in this figure, the mobile terminal device 10 reads bar code symbol in step S600. Afterward, the UIC 50 is decoded from the read bar code symbol in step S602. Text information is extracted from the UIC 50 and is displayed on the mobile terminal device 10 in step S604. Information category index 54B and information content index 54C of UIC 50 are extracted from the UIC 50 in step S606. Afterward, information category index 54B and information content index 54C are sent to server 30 in step S608. The server 30 accesses the database 40 with reference to information category index 54B and information content index 54C in step S610 and the database 40 sends back the relevant information in step S612. The server 30 sends back the relevant information to the mobile terminal device 10 in step S614. The mobile terminal device 10 receives and displays the information relevant to information category index 54B and information content index 54C in step S616. The mobile terminal device 10 extracts associated information index 54D (if exists) from UIC 50 in step S618. The associated information index 54D is sent to the server 30 in step S620. The server 30 accesses the database 40 with reference to the associated information index 54D in step S622 and the database 40 sends back the relevant associated information in step S624. The server 30 retrieves associated information, which is relevant to previous information, in step S626. The mobile terminal device 10 receives and displays the associated information in step S628. The mobile terminal device 10 extracts expansion information index 54E (if exists) from UIC 50 in step S630 and sends expansion information index 54E to the server 30 in step S632. The server 30 accesses the database 40 with reference to the expansion information index 54E in step S634 and the database 40 sends back the relevant expansion information in step S636. The server 30 retrieves the expansion information and sends back the expansion information to the mobile terminal device 10 in step S638. The mobile terminal device 10 receives and displays the expansion information in step S640. The mobile terminal device 10 examines whether any new expansion information index 54E' is contained in the received expansion information in step S642. If any new expansion information index 54E' is found in the received expansion information, the new expansion information index 54E' is sent to the server 30 in step S644. The server 30 accesses the database 40 with reference to the new expansion information index 54E' in step S646 and the database 40 sends back the new expansion information in step S648. The server 30 sends back the new expansion information to the mobile terminal device 10 in step S650. The operations between step S640 and step S650 are repeated until no new expansion information index is found.

Figure 7:
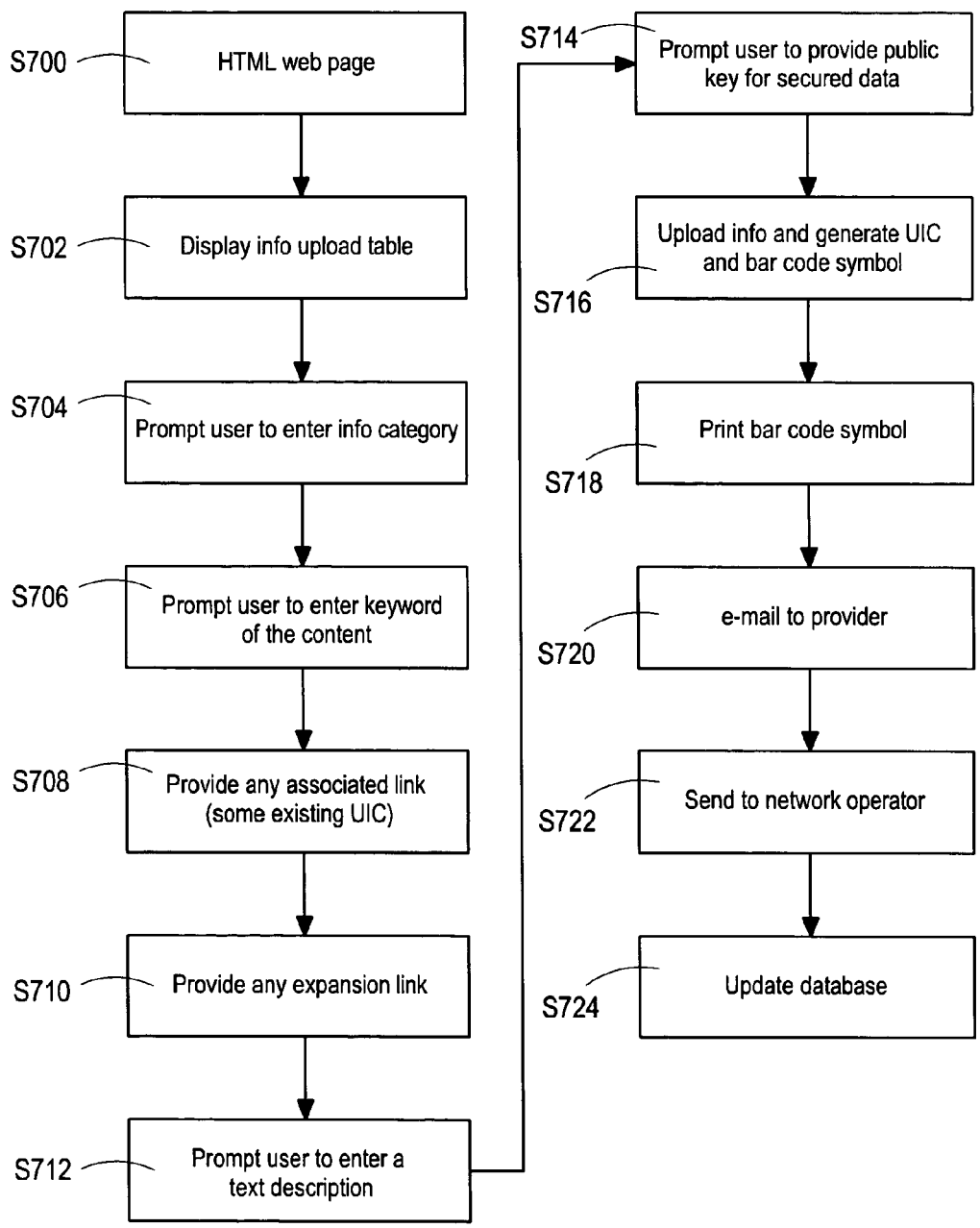
FIG. 7 shows a procedure for uploading information and generating UIC based on the uploaded information.

FIG. 7 shows a procedure for uploading information and generating UIC 50 based on the uploaded information. FIG. 8 shows the format of information upload table.

As shown in FIG. 7, in step S700, the user such as a service provider accesses an HTML web page for uploading information. The HTML web page displays an information upload table in step S702. In step S704, the HTML web page prompts user to enter information categories such as car, book, electronics, CD, music, menu and so on, as shown in FIG. 8. In step S706, the HTML web page prompts user to enter key words of information content such as High performance, Low cost, Power control, Stereo, as shown in FIG. 8. Alternatively, the key words of information content can be automatically generated by software based on the input information categories. In step S708, the HTML web page prompts user to provide link for associated information. In step S710, the HTML web page prompts user to provide link for expansion information. In step S712, the HTML web page prompts user to input text description. In step S714, the HTML web page prompts user to provide public key for secured data. In step S716, UIC and related bar code symbol are generated according to input information of user. In step S718, the bar code symbol is printed out. In step S720, the information input to the upload table is sent to provider through e-mail. In step S722, the information input to the upload table is sent to network operator. Finally, in step S724, user updates the database 40 according to information input.

The bar code symbol generated in step S716 can be printed on document, article, advertisement, or any product catalog, etc. The camera on the mobile terminal device 10 can read or scan the 2D bar code and decode the UIC 50 from the bar code symbol. The index field 52 of the UIC 50 will be used to access the complete document or information from the database 40 via wireless communication between the base station 20 and the mobile terminal device 10.

According to another aspect of the present invention, the index field 54 contained in the UIC 50 can be generated based on hash table technology. It is sufficient to identify any information in a huge database uniquely. Therefore, the UIC can be used as the signature or access code to locate any information from a database. Furthermore, the information exchange can be done on a wireless communication network from a mobile communication device with a bar code scan device, such as a digital camera due to the compact size the proposed UIC.

To sum up, the information code format according to the present invention has following features:

1. Allowing individuals to access or store a vast of information without requiring a mass storage on the mobile communication device. The format of the UIC contains associated information index and expansion information index. Those information indexes allow user to fetch more information based on the previously-fetched information. Moreover, the service provider can upload information to a website according to the information upload table.

2. Providing an indirect accessing method: The UIC only requires a few bytes to 1000 bytes of code to link to any information or document in a database with any size. In fact, the index field of the UIC requires either ipv4 format or ipv6 format to link to any piece of information. In other words, the UIC is a much more efficient and powerful method to access information from a mobile communication device based on 2D bar code format.

3. Providing a secured data accessing/transaction: The authorization field in UIC contains password or public key. The user can input a private key for secured data accessing/transaction along with the password or public key stored in the authorization field.

Moreover, in the present invention, an information webpage in a database can be associated with a 2D bar code and the address of the information webpage is pointed by an index field in the 2D bar code. The index field further includes information category sub-field and information content sub-field to exclusively determine the information webpage. Therefore, the access of specific information webpage can be expedited. Moreover, the index field in the 2D bar code of the present invention further includes associated information sub-field and expansion information sub-field to explore further information linked to the information webpage designated by the index field. User can find more in depth information without needing to input text or web address. This is particularly useful for user of mobile phone.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An information code format used for a two dimensional bar code and indicating a database of information in which an image of the two dimensional bar code is extracted and analyzed by a mobile terminal device for acquiring the information, and then the information extracted from the two dimensional bar code is sent to a server through a base station, the information being at least one of text information, graphic information and multimedia streaming information, the information extracted from the two dimensional bar code having an information code format that includes at least the following fields:

a type field to indicate types of information code application and formats;

an index field which is generated based on hash table technology to indicate a unique information for the database and to include an IP or web address index, an information category index, an information content index, an associated information index, and an expansion information index, wherein the index field records pointers that point to the database connected to the server; and an authorization field to code a password or a public key which is used to match a private key for an authorized user to retrieve an encrypted or secured data information from the database;

wherein the information code format is indicated by the type field and a length of the information code is variable;

wherein types of application specified by the type field include web address translation, phone number or personal data, advertisement information, purchase transaction, document or article search.

2. The information code format as in claim 1, wherein the IP or web address index indicates an IP or web address for the database.

3. The information code format of claim 1, wherein the information category index indicates a list of categories of information in the database.

4. The information code format of claim 1, wherein the information content index indicates content of information in the database.

5. The information code format of claim 1, wherein the associated information index indicates a link to an associated information in the database when the associated information is present or uploaded by the authorized user.

6. The information code format of claim 1, wherein the expansion information index indicates a link to an expansion information in the database when the expansion information is present or uploaded by the authorized user.

7. The information code format of claim 1, further comprising an optional text description field for recording a textual description of the information.

8. A device for accessing an information database, comprising an imaging fetching unit to fetch an image of a two dimensional bar code symbol, wherein information in the two dimensional bar code symbol is encoded in a universal information code (UIC) format having a type field to indicate types of UIC application and formats, an authorization field to store a public key which is used to match a private key for an authorized user to retrieve a secured data information from the information database, and an index field to indicate a unique information for the information database;

a processor connected to the imaging fetching unit and configured to extract the type field and the index field in the bar code symbol; and a wireless transceiver connected to the processor and communicating with the information database;

wherein the index field records pointers that point to the information database connected to a server, a universal information code format is indicated by the type field and a length of the information code is variable, and the points are generated based on hash table technology;

wherein types of application specified by the type field include web address translation, phone number or personal data, advertisement information, purchase transaction, document or article search.

9. The device of claim 8, wherein the universal information code format further comprises a category index in the index field to indicate a list of categories of information in the information database, and the processor is configured to send the category index to the information database to retrieve information related to the category index, where the information is at least one of text information, graphic information and multimedia streaming information.

10. The device of claim 8, wherein the universal information code format further comprises a content index in the index field to indicate a content of information in the information database, and the processor is configured to send the content index to the information database to retrieve information related to the content index, where the information is at least one of text information, graphic information and multimedia streaming information.

11. The device of claim 8, wherein the universal information code format further comprises an associated information index in the index field to indicate a link to an associated information in the information database when the associated information is present or uploaded by the authorized user, and the processor is configured to send the associated information index to the information database to retrieve information related to the associated information index, where the information is at least one of text information, graphic information and multimedia streaming information.

12. The device of claim 8, wherein the universal information code format further comprises an expansion information index in the index field to indicate a link to an expansion information in the information database when the expansion information is present or uploaded by the authorized user, and the processor is configured to send the expansion information index to the information database to retrieve information related to the expansion information index, where the information is at least one of text information, graphic information and multimedia streaming information.

13. The device of claim 8, wherein the universal information code format further comprises an optional text description field for recording a textual description of the information in the information database, and the processor is configured to display the textual description.

14. The device of claim 8, wherein the processor is configured to send the public key and the private key provided by the authorized user to access the secured data in the information database.

15. A method for facilitating a mobile terminal device to access a database wirelessly through a two dimensional bar code symbol, wherein information in the two dimensional bar code symbol is encoded in a universal information code (UIC) format having a type field to indicate types of UIC application and formats, an authorization field to store a public key which is used to match a private key for an authorized user to retrieve a secured data information from the database, an optional text description field to record a textual description of the information in the database, and an index field to indicate a unique information for the database and to have a category index, a content index, an associated information index and an expansion information index, the method comprising:

reading the bar code symbol by the mobile terminal device;

decoding the universal information code from the bar code symbol, where the universal information code has a short or long format indicated by the type field and a length of the universal information code is variable; and identifying type of information in the database by the type field;

wherein the index field records pointers that point to the database connected to a server, and the points are generated based on hash table technology;

wherein types of application specified by the type field include web address translation, phone number or personal data, advertisement information, purchase transaction, document or article search.

16. The method of claim 15, wherein the mobile terminal device accesses the database with the unique information indicated in the index field.

17. The method of claim 15, further comprising
the mobile terminal device sending the category index to access the database; and
the data base sending information related to the category index to the mobile terminal device, where the information is at least one of text information, graphic information and multimedia streaming information.

18. The method of claim 15, further comprising
the mobile terminal device sending the content index to the database; and
the database sending information related to the content index to the mobile terminal device, where the information is at least one of text information, graphic information and multimedia streaming information.

19. The method of claim 15, further comprising
the mobile terminal device sending the associated information index to the database; and
the database sending information related to the associated information index to the mobile terminal device, where the information is at least one of text information, graphic information and multimedia streaming information.

20. The method of claim 15, further comprising
the mobile terminal device sending the expansion information index to the database; and
the database sending information related to the expansion information index to the mobile terminal device, where the information is at least one of text information, graphic information and multimedia streaming information.

21. The method of claim 20, further comprising
the mobile terminal device examining whether new expansion information index is contained in the received information.

22. The method of claim 15, further comprising
the mobile terminal device extracting the text description field and displaying a textual description.

23. The method of claim 15, further comprising
the mobile terminal device extracting the authorization field to obtain the public key; and
the mobile terminal device sending the public key and the private key provided by the authorized user to the database for access the secured data in the database.

* * * * *